United States Patent Office 3,105,061
Patented Sept. 24, 1963

3,105,061
DIORGANOPOLYSILOXANE POLYMERIZATION
Leonard B. Bruner, Midland, Mich., assignor to Dow Corning Corporation, Midland, Mich., a corporation of Michigan
No Drawing. Filed Sept. 28, 1959, Ser. No. 842,586
17 Claims. (Cl. 260—46.5)

This invention relates to a method of preparing organopolysiloxane polymers by the reaction of diacyloxysilanes and siloxanes with mono- and dihydroxy silanes and siloxanes with and without a catalyst.

Alkaline and acidic polymerization systems for organopolysiloxanes are well known in the art. However, the major problem with these systems is the continuous rearrangement of siloxane linkages in the presence of the strong bases and acids used as catalysts in these systems. Every product from such systems is actually an equilibrium mixture of various cyclic and linear polysiloxanes having random unit distribution and a spectrum of molecular weight distribution. While the linear polysiloxanes are all curable notwithstanding variations in unit and molecular weight distributions, the cyclic polysiloxanes have only a diluent effect and do not tie into a polymeric structure under average curing conditions. It is therefore desirable to find some method of producing organosiloxane polymers essentially free of cyclic materials. One of the objects of this invention is to provide such a method.

By the above mentioned alkaline and acidic polymerization methods the attempted preparation of copolymers results at best in a random distribution of the different siloxane units introduced to a system and oftentimes results in no copolymer at all where one siloxane unit proves to be substantially more reactive than any other unit. Another object of this invention is to provide a method of preparing copolymers with a predetermined distribution of units in the ultimate polymers. These objects as well as others which may become apparent are satisfied by this invention.

This invention is a method of preparing polymers having an average of from 1.95 to 2.7 organic radicals per silicon atom comprising reacting in the substantial absence of moisture (1) an organosilicon compound containing at least one and an average of from 1 to 2.05 silicon-bonded hydroxyl groups per molecule with (2) an organosilicon compound containing at least two and an average of from 2 to 2.05 saturated aliphatic monoacyl radicals of less than 4 carbon atoms, said organosilicon compounds (1) and (2) being composed essentially of silicon atoms having attached thereto by silicon-carbon bonds at least two organic radicals selected from the group consisting of monovalent hydrocarbon radicals, halogenated monovalent hydrocarbon radicals and cyanoalkyl radicals, any remaining silicon valences in said compounds being satisfied by silicon-bonded oxygen atoms.

Organosilicon compound (1) includes principally both triorganosilanes of the formula R₃SiOH and silanes and siloxanes of the formulae HO(SiR₂O)ₘH
R(SiR₂O)ₘSiR₂OH and R(SiR₂O)ₘSiR(OH)₂ in which each $m$ is a positive integer. Organosilicon compound (2) includes principally silanes and siloxanes of the formulae AcO(SiR′₂O)ₙAc and R′(SiR′₂O)ₙSiR′(OAc)₂ in which each $n$ is a positive integer and each Ac represents a saturated aliphatic monoacyl radical of less than 4 carbon atoms. R and R′ represent monovalent hydrocarbon radicals, halogenated monovalent hydrocarbon radicals and cyanoalkyl radicals.

For the purpose of this invention the organosilicon compounds (1) and (2) can vary from silanes to non-flowing gums, i.e. $m$ and $n$ can each have values ranging from 1 to 10,000 or more. Preferably, $m$ and $n$ each have values of less than 1500 to facilitate handling and encourage reaction. However, this limitation is not critical. It should be understood that for the purpose of this invention mixtures of compounds can be employed for (1) and (2), which contain molecular species of varying values of $m$ and $n$ respectively. It should also be understood that different acyl (Ac) groups can be present in any one molecule of (2). Several different R and R′ groups can appear in compound (1) and (2). In other words compounds (1) and (2) can each be homopolymers or copolymers or mixtures of such polymers having the same or different values for $m$ and $n$ respectively.

For this invention each acyl radical Ac can be the formyl, acetyl or propionyl radical. Each organic radical R and R′ can be any monovalent hydrocarbon radical such as alkyl radicals such as methyl, ethyl, butyl, tertiary-butyl, octadecyl and myricyl; any alkenyl radical such as vinyl, allyl or hexenyl; any cycloaliphatic hydrocarbon radical such as cyclohexyl, cyclopentyl, cyclohexenyl and cyclobutyl; any alkaryl hydrocarbon radical such as benzyl or β-phenylethyl and any aromatic hydrocarbon radical such as phenyl, tolyl, xylyl, naphthyl, xenyl and phenanthryl. R and R′ can also be any halogenated monovalent hydrocarbon radical such as chloromethyl, pentafluorobutyl, trifluorovinyl, chlorophenyl, bromophenyl, α,α,α-trifluorotolyl, bromoxenyl, chlorotrifluorocyclobutyl, chlorocyclohexyl and iodophenyl.

In addition either R or R′ or both can be any cyanoalkyl radical such as beta-cyanoethyl, gamma-cyanopropyl, omega-cyanobutyl, beta-cyanopropyl, gamma-cyanobutyl and omega-cyanooctadecyl. When the products of this invention contain cyanoalkyl radicals it is preferred that such radicals be attached to at least one mol percent of the silicon atoms in the siloxane elastomer.

The reaction involved in the method of this invention is believed to be:

≡SiOH + AcOSi≡ → ≡SiOSi≡ + AcOH

The reaction must be done in the substantial absence of moisture to avoid hydrolysis of the acyloxy groups but can be accomplished in mutual organic solvents, e.g. toluene, xylene or methylisobutylketone.

Where a triorganosilanol, R₃SiOH, or a monohydroxylated siloxane, R(SiR₂O)ₘSiR₂OH, is reacted with a diacyloxysilane or a siloxane containing two silicon-bonded acyloxy groups as in AcO(SiR′₂O)ₙAc or R′(SiR′₂O)ₙSiR′(OAc)₂, end-blocking occurs resulting in such products as, for example:

R₃SiO(SiR′₂O)ₙSiR′₂OAc,
R₃SiO(SiR′₂O)ₙSiR′₂OSiR₃,
R′(SiR′₂O)ₙSiR′(OAc)OSiR₃,
R′(SiR′₂O)ₙSiR′(OSiR₃)₂,
R(Sir₂O)ₘSiR₂O(SiR′₂O)ₙSir₂OAc,
R(Sir₂O)ₘSiR₂O(SiR′₂O)ₙSiR′₂OSiR₂(OSiR₂)ₘR,
R′(SiR′₂O)ₙSiR′(OAc)OSiR₂(OSiR₂)ₘR,
R′(SiR′₂O)ₙSiR′[OSiR₂(OSiR₂)ₘR]₂,
R₃SiO(SiR′₂O)ₙSiR′₂OSiR₂(OSiR₂)ₘR and
R′(SiR′₂O)ₙSiR′(OSiR₃)OSiR₂(OSiR₂)ₘR.

Where a silanediol or a siloxanediol, HO(SiR₂O)ₘH, or R(SiR₂O)ₘSiR(OH)₂, is reacted with the acyloxated materials above, i.e. AcO(SiR′₂O)ₙAc or R′(SiR′₂O)ₙSiR′(OAc)₂ polymerization occurs without rearrangement to produce polymers of such repeating block units as:

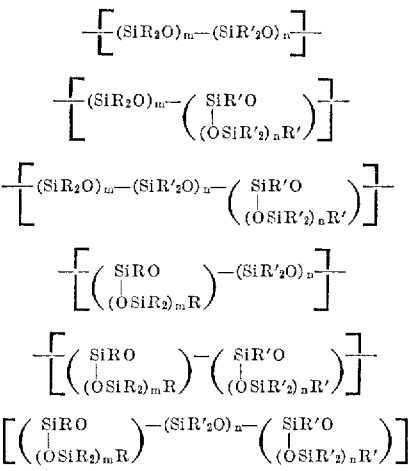

and

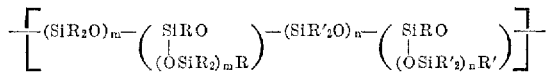

Where the mol ratio of hydroxylated compound (1) to acyloxated compound (2) is greater than 1, the final polymers are generally hydroxy-endblocked. Where this mol ratio of (1) to (2) is less than 1, the final polymers are generally acyloxy-endblocked. This mol ratio can vary from 2:1 to 1:2. As the mol ratio approaches 1 the chances of producing high molecular weight polymers is increased because the situation is avoided where all molecules are either hydroxy-endblocked or acyloxy-endblocked thereby preventing any further reaction by the method of this reaction.

Organosilicon compounds (1) and (2) are composed essentially of silicon atoms each of which has attached thereto by silicon-carbon bonds at least two of the defined organic radicals. The term "composed essentially of" is meant to allow the presence of some monoorganosubstituted silicon atoms in both compounds (1) and (2) thereby allowing for branched chain polymers present in such amount that neither the average number of silicon-bonded hydroxyl groups in (1) nor the average number of silicon bonded acyloxy groups in (2) exceeds 2.05.

Where the average sum of $m$ and $n$ in any molecular mixture exceeds at least 6 and preferably 10, the chances of cyclic polymers forming becomes remote. Where silanes or siloxanes containing from one to five units are the starting materials, the production of cyclic products can be avoided by a stepwise polymerization, such as reacting $R_2Si(OH)_2$ with $R'_2Si(OAc)_2$ in mol ratios of 2:1 and 1:2 to produce separately, for example, $$HOSiR_2OSiR'_2OSiR_2OH$$

and  respectively. These then can be reacted with a much reduced likelihood of any cyclic polymers being formed.

The method of this invention can be satisfactorily accomplished merely by mixing the reactants. However, the larger the molecular size of compounds (1) and (2) and the larger the molecular size of the polymeric product are, the slower the rate of reaction is. The rate of reaction can be accelerated by heating at temperatures up to 200° C.

However, it has been found that the reaction of (1) and (2) can be catalyzed by any non-ionic nitrogen base having a dissociation constant of at least $10^{-10}$. The non-ionic nitrogen bases exclude quaternary ammonium and alkali metal compounds but include ammonia, primary amines, secondary amines and tertiary amines. Examples of operative amines include the following: brucine, sec-butylamine, cocaine, diethylbenzylamine, diethylamine, diisoamylamine, diisobutylamine, dimethylamine, dimethylaminomethylphenol, dimethylbenzylamine, dipropylamine, ethylamine, ethylenediamine, hydrazine, isoamylamine, isobutylamine, isopropylamine, menthanediamine, methylamine, methyldiethylamine, t-octylamine, t-nonylamine, piperidine, n-propylamine, t-octadecylamine, quinine, tetramethylenediamine, triethylamine, triisobutylamine, trimethylamine, trimethylenediamine, tripropylamine, L-arginine, L-lysine, aconitine, benzylamine, cinchonidine, codeine, coniine, emetine, o-methoxybenzylamine, m-methoxybenzylamine, p-methoxybenzylamine, N,N-methoxybenzylamine, o-methylbenzylamine, m-methylbenzylamine, p-methylbenzylamine, N,N-methylbenzylamine, morphine, nicotine, novocain base, epsilon-phenylamylamine, delta-phenylbutylamine, $\beta$-phenylethylamine, $\beta$-phenylethylmethylamine, gamma - phenylpropylamine, N,N - isopropylbenzylamine, physostigmine, piperazine, quinidine, solamine, sparteine, tetramethylguanidine, thebaine, t-butyl-2,4-dinitrophenylamine, t - butyl - 2 - hydroxy-5-nitrobenzylamine, t-butyl-4-isonitrosoamylamine, t-ocylamylamine, t-octyl-2-($\beta$ - butoxyethoxy)ethylamine, 2,4,6 - tris(dimethylamino)phenol, aniline, phenylhydrazine, pyridine, quinoline, p-bromophenylhydrazine, n-nitro - o - toluidine, $\beta$-ethoxyethylamine, tetrahydrofurfurylamine, m-aminoacetophenone, iminodiacetronitrile, putrescine, spermin, gamma-N,N-dimethylaminopropylpentamethyldisiloxane, p-toluidine and veratrine. Also operative herein are condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, $\alpha,\beta$-dimethylacrolein and amylamine, butyraldehyde and butylamine, acrolein and allylamine and formaldehyde and heptylamine.

Ammonia can be used as a catalyst either by exposure of the organosilicon mixture to a stream of ammonia in a closed system or by generating the ammonia in situ as by the decomposition of a compound such as ammonium carbonate in contact with the organosilicon mixture.

Carboxylic acid salts of the above-identified bases are also operative as catalysts for the method of this invention although they are not as efficient as the bases themselves. Examples of carboxylic acids which can be used in the preparation of amine salts for the method of this invention include the following: abietic acid, acetic acid, cyanoacetic acid, phenoxyacetic acid, acrylic acid, $\beta$-benzoylacrylic acid, angelic acid, anisic acid, N-acetylanthranilic acid, arachidic acid, atropic acid, benzoic acid, o-bromobenzoic acid, p-cyanobenzoic acid, 2,6-dichlorobenzoic acid, 2,5-dinitrobenzoic acid, m-fluoro-benzoic acid, brassidic acid, dl-campholic acid, capric acid, cinnamic acid, cyclohexanecarboxylic acid, cyclopropanecarboxylic acid, formic acid, 3-furancarboxylic acid, trimethylsilylacetic acid, 5-nitro-2-furoic acid, 10-hendecenoic acid, $\beta$-carboxyethylpentamethyldisiloxane, isobutyric acid, lauric acid, levulinic acid, lignoceric acid, linoleic acid, oleic acid, stearic acid, tetrahydropyromucic acid, 3-ethylpentanoic acid and 2,4-xylic acid.

Polycarboxylic acids while not preferred can also be employed in preparing the amine salt catalyst of this invention. Examples of such acids include: adipic acid, azelaic acid, o-carboxymethoxybenzoic acid, 1-camphoric acid, 1,2-cyclobutanedicarboxylic acid, sym-bis-$\beta$-carboxyethyltetramethyldisiloxane, 1,2,3,4,5,6-cyclohexanehexacarboxylic acid, 1,3-cyclopentanedicarboxylic acid, diphenic acid, ethylmalonic acid, pimelic acid, sebacic acid, succinic acid and traumatic acid.

The amount of catalyst is not critical. If the catalyst is employed in excessive amounts it merely acts as a solvent for the system. To be at all effective the catalyst must be present in an amount equivalent to at least 0.1% by weight based on the total weight of compounds (1) and (2).

It is preferable but not necessary that the amine or amine salt catalyst be present in an amount sufficient to give a ratio of one basic nitrogen for each acyloxy radical in (2) thereby insuring the fastest reaction rate.

The method of this invention is useful for selectively endblocking polymers, for producing cyclic-free polymers and for producing copolymers of predetermined unit distribution.

The following examples are merely illustrative and are not intended to limit this invention which is properly delineated in the claims. All viscosity measurements were made at 25° C.

EXAMPLE 1

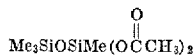

was prepared by adding Me$_3$SiOH dropwise to a mixture of

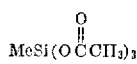

pyridine and toluene and vacuum distilling the product at 52° C. at 4 to 5 mm. Hg absolute pressure.

Equimolar amounts of

and a 129 cs. hydroxy-endblocked dimethylpolysiloxane ($m \simeq 78.4$) were mixed and heated at 110° C. for 24 hours after which the viscosity had increased to 4400 cs.

EXAMPLE 2

Equimolar amounts of

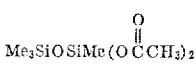

and a 1920 cps. hydroxy-endblocked dimethylpolysiloxane ($m \simeq 288$) were mixed with stirring with 0.5% by weight of n-hexylamine-2-ethylhexoate. After 18 hours at 37° C. the viscosity of the system had risen to 23,500 cps. The system consisted primarily of a copolymer of Me$_3$SiOSiMeO units and SiMe$_2$O units.

EXAMPLE 3

was prepared by adding Ph$_2$MeSiOH dropwise to

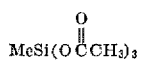

and vacuum distilling the product at 173° C. at 2 mm. Hg absolute pressure.

2.58 grams of

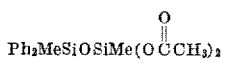

0.3 gram of n-hexylamine-2-ethylhexoate and 51.0 grams of a 192 cps. hydroxy-endblocked dimethylpolysiloxane ($m \simeq 100$) were mixed together and allowed to stand in a capped bottle at room temperature. After 24.5 hours the viscosity of the system had reached 1680 cps. Present in the system was a copolymer of Ph$_2$MeSiOSiMeO units and SiMe$_2$O units.

EXAMPLE 4

1.63 grams of diphenyldiacetoxysilane were added dropwise to a mixture of 144.0 grams of a 3460 cps. hydroxy-endblocked dimethylpolysiloxane ($m \simeq 358$) and about 0.25 gram of di-n-hexylamine. After 17 hours at room temperature the system contained a copolymer of Ph$_2$SiO units and Me$_2$SiO units which raised the viscosity of the mixture to 56,000 cps.

EXAMPLE 5

142 grams of a 9740 cps. hydroxy-endblocked dimethylpolysiloxane ($m \simeq 520$), 3 grams of di-n-hexylamine and 0.443 gram of dimethyldiacetoxysilane were mixed together at 25° C. After 20 hours at room temperature the cyclic-free dimethylpolysiloxane product had a viscosity of 173,000 cps. which remained constant for 50 hours.

EXAMPLE 6

138 grams of a 9740 cps. hydroxy-endblocked dimethylpolysiloxane, 2.8 grams of di-n-hexylamine and 1.3 grams of 3,3,3-trifluoropropylmethyldiacetoxysilane were mixed together at 25° C. After one hours the viscosity of the system was 2,400,000 cps.; after 18 hours the viscosity was in the 10,000,000 cps. range. The product of the reaction was a copolymer of F$_3$CCH$_2$CH$_2$SiMeO units and SiMe$_2$O units.

EXAMPLE 7

140 grams of a 9740 cps. hydroxy-endblocked dimethylpolysiloxane, 2.8 grams of di-n-hexylamine and 0.88 gram of

were mixed at 25° C. After 1.5 hours the viscosity of the system had risen to 144,000 cps. due to the formation of a copolymer of ClCH$_2$CH$_2$CH$_2$SiMeO units and SiMe$_2$O units.

EXAMPLE 8

133.7 grams of a 9740 cps. hydroxy-endblocked dimethylpolysiloxane, 2.7 grams of di-n-hexylamine and 1.58 grams of an acetoxy-endblocked dimethylpolysiloxane containing an average of 4.68 silicon atoms per molecule were mixed together. After 1.5 hours at 25° C. the viscosity of the system had risen to 144,000 cps. due to the formation of a cyclic-free high polymer dimethylpolysiloxane.

EXAMPLE 9

Ammonia gas was bubbled for several minutes through a mixture of 135 grams of a 9740 cps. hydroxy-endblocked dimethylpolysiloxane and 0.42 gram of dimethyldiacetoxysilane. The system was then closed and maintained at 25° C. After 90 hours the viscosity of the system had risen to 48,400 cps.

EXAMPLE 10

20 grams of a 51 cs. hydroxy-endblocked dimethylpolysiloxane ($m \simeq 44$) were mixed with 4.36 grams of phenylmethyldiacetoxysilane and heated for approximately 16 hours at 150° C. producing a fluid having a viscosity of 2000 cs. This fluid consisting of copolymers of PhMeSiO units and Me$_2$SiO units continued to increase in viscosity due to polymerization until the product viscosity had risen to 8000 cs. after 4 days at room temperature exposed to the air.

EXAMPLE 11

10 gram samples of a 51 cs. hydroxy-endblocked dimethylpolysiloxane were mixed with the following amounts of phenylmethyldiacetoxysilane and heated for 20 hours at 150° C. exposed to the atmosphere. The resulting PhMeSiO—Me$_2$SiO copolymers had the viscosities shown.

*Table I*

| PhMeSi(OCCH$_3$)$_2$(gms.): | Vis. (cs.) |
|---|---|
| 2.1 | 1,720 |
| 2.0 | 10,200 |
| 1.9 | 10,500 |
| 1.8 | 46,200 |

EXAMPLE 12

0.9 gram of pyridine was added to mixtures such as those employed in Example 11 and each system was sealed for 20 hours at room temperature. The resulting PhMeSiO—Me$_2$SiO copolymers had the following viscosities.

Table II

| PhMeSi(OCCH$_3$)$_2$(gms.):  | Vis. (cs.) |
|---|---|
| 2.1 | 1,060 |
| 2.0 | 1,600 |
| 1.9 | 685 |
| 1.8 | 420 |

EXAMPLE 13

A mixture of 100 grams of a 46.1 cs. hydroxy-endblocked dimethylpolysiloxane ($m \approx 40$), 21.1 grams of phenylmethyldiacetoxysilane and 11.0 grams of pyridine was allowed to stand 42 hours at room temperature, was then dissolved in diethylether, was washed several times with water and was stripped to yield 108.3 grams of a 2400 cps. PhMeSiO—Me$_2$SiO copolymer.

This polymer was compounded with 40% by weight of diatomaceous earth and small amounts of a trimethylsiloxy-endblocked methylhydrogenpolysiloxane fluid and dibutyltindilaurate and cured to a rubbery solid at room temperature.

EXAMPLE 14

A mixture of 16.6 grams of HO(SiMe$_2$O)$_2$H, 23.8 grams of phenylmethyldiacetoxysilane and 10 grams of pyridine was allowed to stand at room temperature for 72 hours. The reaction product was dissolved in ether, washed with water and stripped to yield a copolymer of PhMeSiO units and O$_{.5}$SiMe$_2$OSiMe$_2$O$_{.5}$ units having a viscosity of 12,700 cps.

EXAMPLE 15

The addition of 0.2 gram of vinylmethyldiacetoxysilane over a period of one-half hour to a mixture of 5 grams of a 5000 cps. hydroxy-endblocked dimethylpolysiloxane ($m \approx 412$) and 0.2 gram of tetramethylguanidine produced a ViMeSiO—Me$_2$SiO copolymer of approximately 500,000 cps. viscosity. The white insoluble tetramethylguanidinium acetate was removed by heating the product approximately 16 hours at 150° C.

EXAMPLE 16

After from 2 to 2½ hours at room temperature the product of a mixture of 100 parts of a 3490 cps. hydroxy-endblocked dimethylpolysiloxane ($m \approx 359$), 2 parts of di-n-hexylamine and from 0.5 to 1 parts of vinylmethyldiacetoxysilane was a ViMeSiO—Me$_2$SiO co polymeric gum with an estimated Williams plasticity of 0.050 to 0.060.

EXAMPLE 17

When 1 mol of a propionoxy-endblocked polysiloxane containing 1500 dimethylsiloxane units per molecule is mixed at room temperature with two moles of phenylmethylvinylsilanol in the presence of one mol of $$Me_3SiOSiMe(CH_2)_3NMe_2$$

a reaction takes place resulting in a product consisting essentially of PhMeViSiO(SiMe$_2$O)$_{1500}$SiPhMeVi.

EXAMPLE 18

When 3,3,3-trifluoropropyldimethylsilanol is substituted for the phenylmethylvinylsilanol in Example 17, the product is essentially $$CF_3CH_2CH_2SiMe_2O(SiMe_2O)_{1500}SiMe_2CH_2CH_2CF_3$$

EXAMPLE 19

When 1 mol of the following organosilicon compounds (1) are mixed with 1 mol of the following organosilicon compounds (2) in the presence of one mol of the following catalysts as shown below the products are polymers made up of the recurring units shown below.

| Component (1) | Component (2) | Catalyst | Siloxane Unit |
|---|---|---|---|
| HO(SiPhMeO)$_{500}$H | MeViSi(OCCH$_3$)$_2$ | Triethylamine | $-[(SiPhMeO)_{500}SiMeViO]-$ |
| Vi(SiMe$_2$O)$_4$OSiPh(OH)$_2$ | CH$_3$CO(SiMe$_2$O)$_{700}$CCH$_3$ | 1,4-bis-diethylaminobutane | $-[SiPhO(SiMe_2O)_{700}- \mid (OSiMe_2)_3OSiMe_2Vi]-$ |
| CF$_3$CH$_2$CH$_2$SiVi(OH)$_2$ | —HCO(SiMeO)$_{100}$OCH with CH$_2$CH$_2$CF$_3$ | Dimethylamine | $-[SiViO(\stackrel{CH_2CH_2CF_3}{SiMeO})_{100}- \mid CH_2 \mid CH_2 \mid CF_3]-$ |
| HO(SiMe$_2$O)$_{1200}$H | Vi$_2$Si(OCCH$_3$)$_2$ | Tetramethylguanidine | $-[(SiMe_2O)_{1200}SiVi_2O]-$ |

That which is claimed is:

1. The method comprising reacting in the substantial absence of moisture (1) an organosilicon compound containing at least one and an average of from 1 to 2.05 silicon-bonded hydroxyl groups per molecule wth (2) an organosilicon compound containing per molecule at least two and an average of from 2 to 2.05 silicon-bonded acyl radicals of alkanoic acids of less than 4 carbon atoms, the remaining valences of the silicon atoms in compounds (1) and (2) which are not satisfied by said hydroxyl radicals and said acyl radicals respectively, being satisfied by substituents selected from the group consisting of oxygen atoms of SiOSi linkages and organic radicals attached to the silicon through silicon-carbon bonds, said organic radicals being selected from the group consisting of monovalent hydrocarbon radicals, halogenated monovalent hydrocarbon radicals and cyanoalkyl radicals, the ratio of said organic radicals to silicon atoms in (1) and (2) being such that the polymer resulting from said reaction has an average of from 1.95 to 2.7 inclusive of said organic radicals per silicon atom and said resulting polymer having a molecular weight greater than each of (1) and (2).

2. The method of claim 1 in contact with a catalyst selected from the group consisting of non-quaternary nitrogen bases having a dissociation constant of at least $10^{-10}$ and carboxylic acid salts of said bases.

3. A method of preparing siloxane polymers comprising reacting in a mol ratio ranging from 2:1 to 1:2 (1) an organosilicon compound of the formula $$HO(SiR_2O)_mH$$ 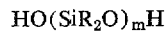

with (2) an organosilicon compound of the formula AcO(SiR'$_2$O)$_n$Ac in which each R and each R' are monovalent hydrocarbon radicals, $m$ and $n$ are each integers from 1 to 10,000 inclusive and each Ac is the acyl radical of the alkanoic acid of less than 4 carbon atoms, said reaction taking place in the substantial absence of moisture.

4. The method of claim 3 in contact with a catalyst selected from the group consisting of non-ionic nitrogen bases having a dissociation constant of at least $10^{-10}$ and carboxylic acid salts of said bases.

5. A method of preparing siloxane polymers comprising reacting in a mol ratio ranging from 2:1 to 1:2 (1) an organosilicon compound of the formula $$HO(SiR_2O)_mH$$

with (2) an organosilicon compound of the formula $AcO(SiR'_2O)_nAc$ in which some of the R and R' groups are monovalent hydrocarbon radicals and the remainder of the R and R' groups are halogenated monovalent hydrocarbon radicals, $m$ and $n$ are each integers from 1 to 10,000 inclusive and each Ac is the acyl radical of an alkanoic acid of less than 4 carbon atoms, said reaction taking place in the substantial absence of moisture.

6. The method of claim 5 in contact with a catalyst selected from the group consisting of non-quaternary nitrogen bases having a dissociation constant of at least $10^{-10}$ and carboxylic acid salts of said bases.

7. A method of preparing siloxane polymers comprising reacting in an approximately equimolar ratio (1) an organosilicon compound of the formula $HO(SiR_2O)_mH$ with (2) an organosilicon compound of the formula $AcO(SiR'_2O)_nAc$ in which each R and each R' are monovalent hydrocarbon radicals, $m$ and $n$ are each integers from 1 to 10,000 inclusive and each Ac is the acyl radical of an alkanoic acid of less than 4 carbon atoms, said reaction taking place in the substantial absence of moisture, whereby an increase in molecular weight over the starting materials is attained.

8. The method of claim 7 in contact with a catalyst selected from the group consisting of non-quaternary nitrogen bases having a dissociation constant of at least $10^{-10}$ and carboxylic acid salts of said bases.

9. A method of preparing siloxane polymers comprising reacting in an approximately equimolar ratio (1) an organosilicon compound of the formula $HO(SiR_2O)_mH$ wtih (2) an organosilicon compound of the formula $AcO(SiR'_2O)_nAc$ in which some of the R and R' groups are monovalent hydrocarbon radicals and the remainder of the R and R' groups are halogenated monovalent hydrocarbon radicals, $m$ and $n$ are each integers from 1 to 10,000 inclusive and each Ac is the acyl radical of an alkanoic acid of less than 4 carbon atoms, said reaction taking place in the substantial absence of moisture, whereby an increase in molecular weight over the starting materials is attained.

10. The method of claim 9 in contact with a catalyst selected from the group consisting of a non-quaternary nitrogen bases having a dissociation constant of at least $10^{-10}$ and carboxylic acid salts of said bases.

11. A method comprising reacting a silanol of the formula $R_3SiOH$ with an organosilicon compound of the formula $AcO(SiR'_2O)_nAc$ in which each R and each R' are monovalent hydrocarbon radicals, each $n$ is an integer from 1 to 10,000 inclusive and each Ac is the acyl radical of an alkanoic acid of less than 4 carbon atoms, said reaction taking place in the substantial absence of moisture.

12. The method of claim 11 in contact with a catalyst selected from the group consisting of a non-quaternary nitrogen bases having a dissociation constant of at least $10^{-10}$ and carboxylic acid salts of said bases.

13. A method comprising reacting a silane of the formula $R_3SiOH$ with an organosilicon compound of the formula $AcO(SiR'_2O_nAc$ in which some of the R and R' groups are monovalent hydrocarbon radicals and the remainder of the R and R' groups are halogenated hydrocarbon radicals, each $n$ is an integer from 1 to 10,000 inclusive and each Ac is the acyl radical of an alkanoic acid of less than 4 carbon atoms, said reaction taking place in the substantial absence of moisture.

14. The method of claim 13 in contact with a catalyst selected from the group consisting of non-quaternary nitrogen bases having a dissociation constant of at least $10^{-10}$ and carboxylic acid salts of said bases.

15. The method of claim 1 in which some of the organic radicals are methyl radicals, the remainder of the organic radicals are aryl radicals and each Ac is the acetyl radical.

16. The method of claim 1 in which some of the organic radicals are monovalent hydrocarbon radicals of less than seven carbon atoms, the remainder of the organic radicals are 3,3,3-trifluoropropyl radicals and each Ac is the acetyl radical.

17. The method of claim 1 in which some of the organic radicals are methyl radicals, the remainder of the organic radicals are 3,3,3-trifluoropropyl radicals and each Ac is the acetyl radical.

References Cited in the file of this patent

UNITED STATES PATENTS

| | | |
|---|---|---|
| 2,605,274 | Tyler | July 29, 1952 |
| 2,658,908 | Nitzsche et al. | Nov. 10, 1953 |
| 2,728,743 | Warrick | Dec. 27, 1955 |

UNITED STATES PATENT OFFICE
CERTIFICATE OF CORRECTION

Patent No. 3,105,061 September 24, 1963

Leonard B. Bruner

It is hereby certified that error appears in the above numbered patent requiring correction and that the said Letters Patent should read as corrected below.

Column 9, line 5, for "non-ionic" read -- non-quaternary --.

Signed and sealed this 10th day of November 1964.

(SEAL)
Attest:

ERNEST W. SWIDER
Attesting Officer

EDWARD J. BRENNER
Commissioner of Patents